United States Patent [19]

Thomas et al.

[11] Patent Number: 5,692,473
[45] Date of Patent: Dec. 2, 1997

[54] BURST KNOCK PREVENTION AT HIGH ENGINE LOAD

[75] Inventors: Christopher P. Thomas, West Bloomfield; Howard W. Krausman, Dexter; James L. Vincent, Troy; Thomas W. Asmus, Oakland; Dennis A. Krozek, Novi, all of Mich.

[73] Assignee: Chrysler Corporation, Auburn Hills, Mich.

[21] Appl. No.: 685,400

[22] Filed: Jul. 23, 1996

[51] Int. Cl.$^6$ .................................................... F02P 5/15
[52] U.S. Cl. .......................................... 123/413; 123/422
[58] Field of Search ...................................... 123/413, 422

[56] References Cited

U.S. PATENT DOCUMENTS 5,040,509  8/1991  Nakaki et al. ........................ 123/422
5,119,782  6/1992  Kashiwabara et al. ............... 123/422

FOREIGN PATENT DOCUMENTS 3309947  7/1984  Germany ............................... 123/422

*Primary Examiner*—Andrew M. Dolinar
*Attorney, Agent, or Firm*—Mark P. Calcaterra

[57] ABSTRACT

The present invention provides an apparatus for limiting the occurrence of knock conditions in an internal combustion engine. The apparatus includes a throttle sensor that detects transition of an engine throttle from a steady state throttle condition to a wide open throttle condition. Further, spark means is provided for generating a spark for an engine cylinder firing event, with the spark means generating the spark with an associated spark advance. Further, a controller is provided that is responsive to the wide open throttle condition detected by the throttle sensor and that causes the spark advance to incrementally advance to a maximum level over a predetermined time period, thereby minimizing the occurrence of engine knock conditions.

13 Claims, 3 Drawing Sheets

BURST KNOCK PREVENTION AT HIGH ENGINE LOAD

BACKGROUND OF THE INVENTION

1. Technical Field

The present invention relates generally to internal combustion engines and, more particularly, to an apparatus and method for incrementally advancing engine spark advance in response to a wide open throttle condition to prevent engine burst knock cycles.

2. Discussion

A conventional four cycle internal combustion engine typically includes at least four pistons located within corresponding piston cylinders. Each of these pistons has four associated strokes during the engine combustion cycle: a fuel intake stroke, a fuel compression stroke, an expansion stroke in which the piston rotates the engine crankshaft; and an exhaust stroke in which burned gas and associated byproducts are exhausted from the cylinder. At some point subsequent to the piston intake stroke and prior to the piston reaching top dead center (TDC) on the compression stroke, a spark plug associated with the cylinder fires a spark to initiate the combustion that drives the piston in its expansion stroke. The spark advance, or timing, of the spark determines the phasing of the burn for the fuel/air mixture in the cylinder, and thus directly affects engine performance. The burn rate may be controlled by varying spark occurrence with respect to the crank angle of the piston before the piston reaches TDC on its compression stroke.

The above mentioned combination of load, spark advance and fuel/air mixture strength determines the temperature of the residual, which is the burned gas that is retained in the cylinder. Hence, the temperature of the residual gas thereby directly affects subsequent combustion events. Particularly, the residual gas temperature affects combustion events correlating to the occurrence of a wide open throttle state and susceptibility to knock. As a wide open throttle state subsequently increases the fuel mixture strength supplied to the cylinder, the spark advance steps in direct relation thereto.

Under knock-limited conditions when increase in load reduce residual gas temperature in response to fuel mixture environment at the heavier load, a period of increased knock susceptibility or "burst knock" may occur during the transition from lighter to heavier loads.

Ideally, the combustion of the fuel-air mixture within the cylinder is caused by a uniform flame front that progresses across the cylinder over a finite period of time. However, the above mentioned large change in spark advance that may occur between a part-throttle state and a wide open throttle state is undesirable, as the high temperature of the residual causes the resulting spark timing to advance too rapidly, thus causing several knocking cycles during the transition.

Therefore, there is a need for a method and apparatus that minimizes the occurrence of engine knock conditions in an internal combustion spark ignited engine during engine transition from part-throttle condition to a wide open throttle condition.

SUMMARY OF THE INVENTION

In accordance with the teachings of the present invention, a system and method for preventing knock conditions in an internal combustion spark ignited engine are provided. The present invention prevents the aforementioned engine knock conditions by controlling the rate of change of engine spark advance. The present invention allows maximum spark advance to be utilized constrained only by steady-state knock-limited spark advance at full load as well as at heavy, part load conditions.

In particular, the present invention provides an apparatus for limiting the occurrence of knock conditions in an internal combustion engine. The apparatus includes a throttle sensor that detects transition of an engine throttle from a part-load condition to a wide open throttle condition. Further, spark means is provided for generating a spark for an engine cylinder firing event, with the spark means generating the spark with an associated spark advance. Further, a controller is provided that is responsive to the load change and detected by the throttle sensor that causes the spark timing to incrementally advance to a maximum level over a predetermined time period.

DETAILED DESCRIPTION OF THE DRAWINGS

Figure 1:
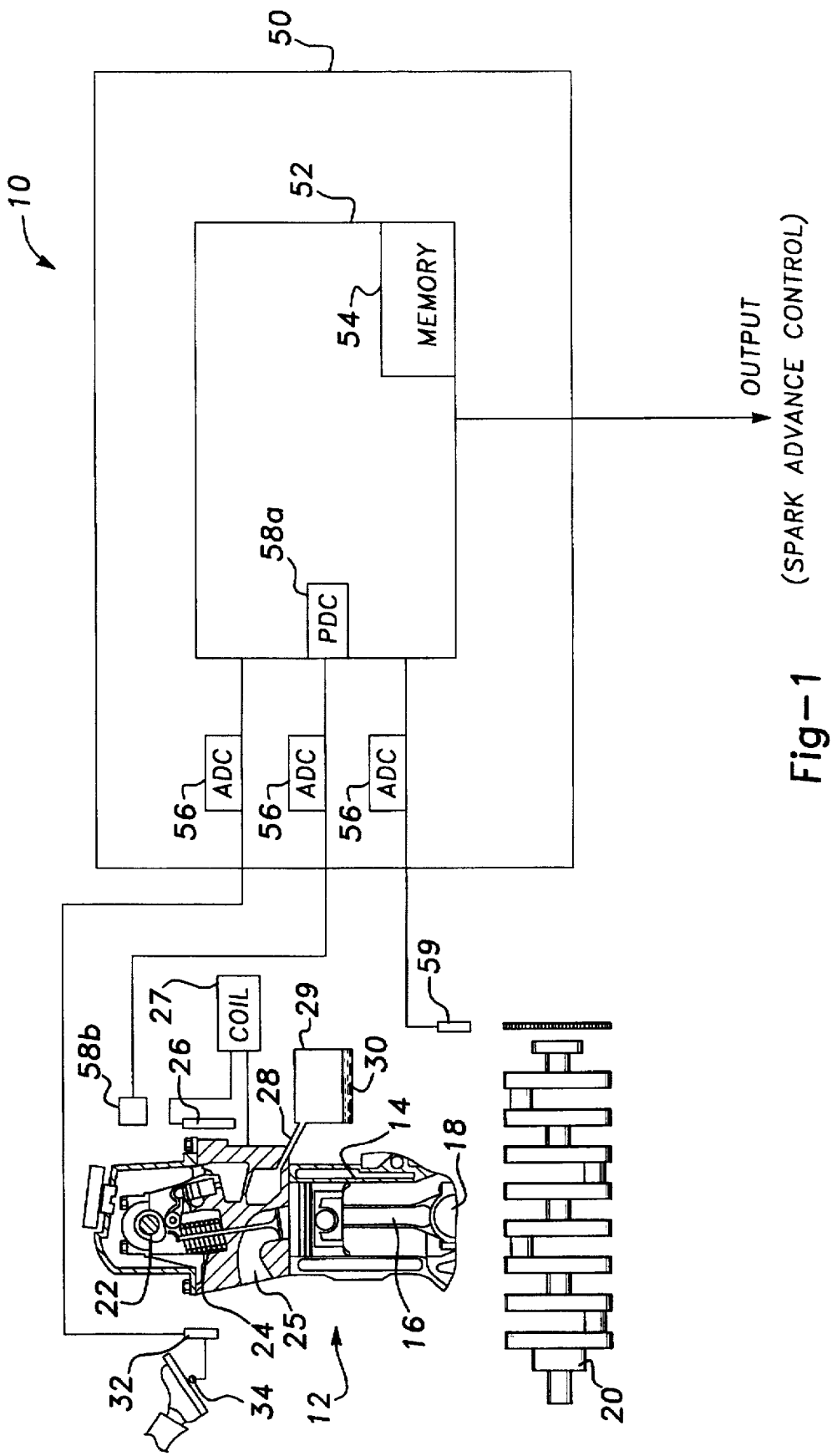
FIG. 1 is a side elevational view of a motor vehicle spark ignited internal combustion engine in cross-section, a crankshaft associated with the engine, and a motor vehicle electronic control unit.
Figure 4:
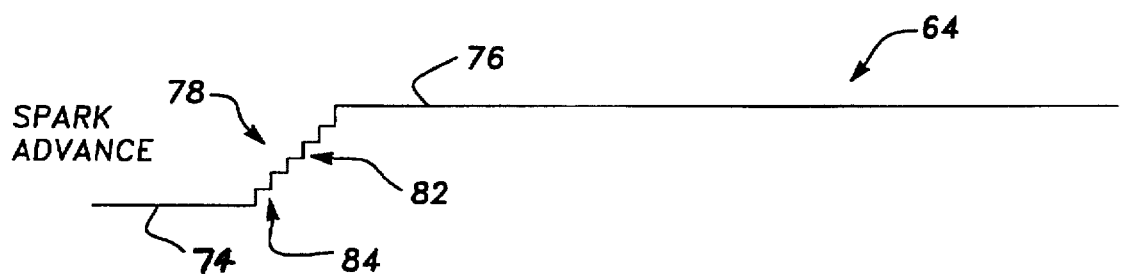
Figure 5:
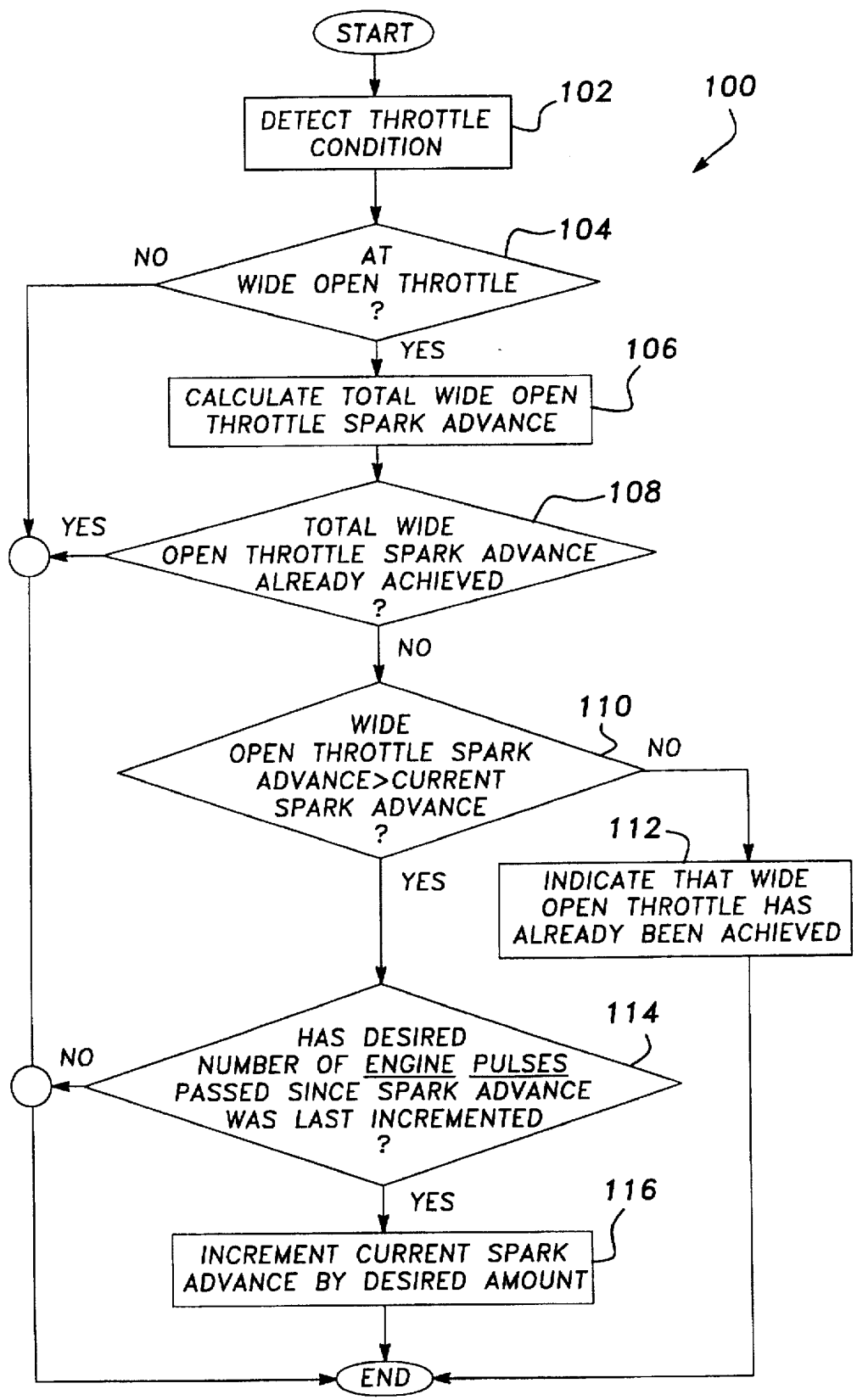

FIG. 4 is a graph illustrating the increase in spark advance of the engine of FIG. 1 in response to the engine transition from a part-throttle condition to a wide open throttle condition as incremented over a predetermined time period in accordance with the spark advance timing control technique of the present invention; and FIG. 5 is a flow diagram illustrating the preferred method of implementation of the spark advance timing control of the present invention.

DETAILED DESCRIPTION OF THE PREFERRED EMBODIMENT

Referring now to the drawing figures, a block diagram of the engine system, in which the burst knock prevention system of the present invention is implemented, is shown generally at 10. The system 10 includes an internal combustion spark ignited engine 12, shown in partial cross-section, which is of the type implemented in a conventional motor vehicle (not shown). The engine contains a plurality of cylinders, represented by the cylinder 14, with each of the cylinders having a piston, represented by the piston 16, operatively disposed therein. Each of the pistons is connected by a connecting rod 18 to a crankshaft 20. A conventional engine cam shaft 22 is also operatively located within the engine for opening and closing an intake valve or valves, such as the valve 24, associated with the cylinder 14 for supplying a fuel-air mixture to the cylinders in a manner well known in the art during the piston intake stroke. A manifold 25 is also operatively associated with the intake valve 24 for supplying fuel-air mixture from outside of the engine into the cylinder 14.

The engine 12 is a conventional four-cylinder, four-stroke engine having an intake stroke in which fuel-air mixture is input into the cylinder 14 through the intake valve 24, a compression stroke in which the fuel-air mixture is compressed by the piston 16, an expansion stroke in which a spark supplied by a spark plug 26 powered by a coil 27 ignites the fuel-air mixture, and an exhaust stroke during which gases from the burned fuel are exhausted from the cylinder through an exhaust system 28 including an after-treatment system 29 having an associated catalyst 30, and during which residual is retained in the cylinder to be mixed with the subsequent fuel-air change. Although the spark timing control of the present invention is implemented in a four cylinder, four-stroke engine such as that shown at 12, it should be appreciated that the present invention may be implemented in any conventional spark-ignited engine operated on either two or four stroke cycles. Additionally, a throttle sensor 32 is in operative communication with an engine throttle 34 to sense changes in the throttle from a part-throttle condition to a wide open throttle condition and communicate these sensed changes to an engine control unit (ECU) 50.

The ECU 50 includes a micro-controller 52 having an associated memory 54 and analog to digital converters 56 for converting analog signals from the sensor 32 to digital signals. The memory 54 is a memory of the type well known in the art, such as random access memory (RAM), read-only memory (ROM), or any other similar type of conventional computer memory. The ECU 50 also includes peak detection circuitry 58a in communication with a knock sensor 58b for detecting the occurrence of engine combustion knock events. The knock sensor signal enters the controller through the peak detection circuit 58a. The ECU also includes a crank sensor 59 for detecting engine firing events. The crank sensor 59 is preferably a Hall effect sensor that produces digital edges counted by the logic of the ECU, as will be described below.

The ECU 50 further includes additional timers, counters and like components of the type typically associated with a conventional micro-controller and which are used to implement the present invention.

Figure 2:
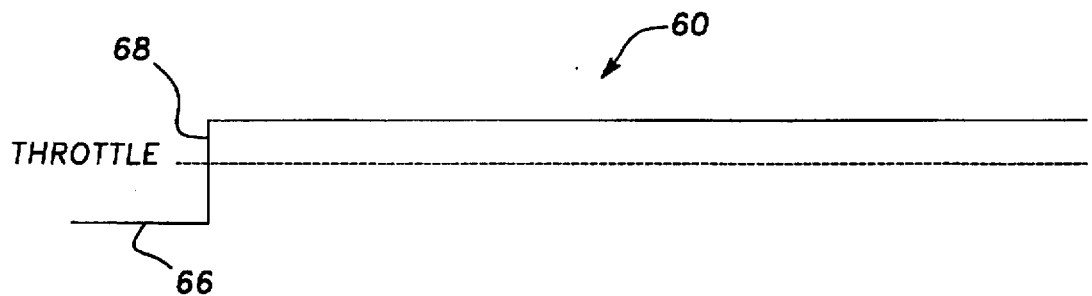
FIG. 2 is a graph illustrating transition of the engine in FIG. 1 from a part-throttle condition to a wide open throttle condition.
Figure 3:
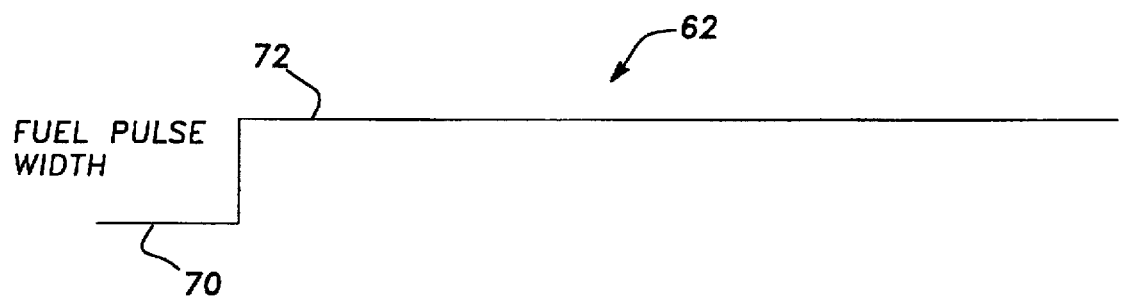
FIG. 3 is a graph illustrating the transition of a fuel pulse of the engine shown in FIG. 1 from a part-throttle condition to a wide open throttle condition.

Referring now to FIGS. 2, 3 and 4, timing events associated with the engine throttle, the corresponding fuel pulse and the spark advance are shown at 60, 62, and 64, respectively. Referring to the throttle timing sequence at 60, the throttle 34 is in a partially open, or transient, state at 66. Subsequently, as indicated at 68, the motor vehicle operator causes the throttle to advance to a wide open condition. In this wide open condition, the cylinder valves 24 input a fuel-air mixture into the cylinder 14 that has a higher fuel content. As indicated by the fuel pulse in FIG. 3, the fuel mixture steps from a level corresponding to a partially open throttle condition, as indicated at 70, to a level corresponding to a wide open throttle condition, as indicated at 72.

In response to the wide open throttle condition, the electronic control unit 50 receives a signal from the throttle sensor 32 indicating the transition to a wide open throttle condition. Subsequently, the electronic control unit causes the spark advance to increment from a level, indicated at 74, associated with a part-throttle condition, to a level associated with the wide open throttle condition, indicated at 76, in a stepwise manner indicated generally at 78. Each vertical edge, such as the edge 82, represents an incremental advance in the spark advance, whereas each horizontal edge, such as the horizontal edge 84, represents a programmable time period that elapses before a subsequent spark advance increment occurs. Preferably this programmable time period corresponds to a predetermined number of cylinder firing events. Preferably, for a six cylinder engine, this predetermined number of firing events is set at twelve. However, the number of firing events is programmable into the micro-controller 52 and may vary according to the particular type of engine or motor vehicle in which the present invention is implemented. As discussed earlier, preferably each firing event is detected by the crank sensor 59. The observation window of the knock sensor peak detection circuitry 58a is from top dead center (TDC to 51° ATDC).

Therefore, the engine spark advance control of the present invention prevents a typical instantaneous step increase of the spark advance from a part-throttle level to a wide open throttle level in response to a corresponding throttle increase. Rather, the spark advance control of the present invention advances spark timing to a wide open throttle condition incrementally over a predetermined time period. The spark advance increases to the desired wide open throttle level to correspond to richer fuel conditions in the cylinder, while ensuring that the residual reaches a desired equivalent temperature at the wide open throttle condition and this may be 25° to 35° C. lower than at the heavy part-load condition.

The present invention therefore overcomes the limitations of prior knock sensor control systems that address engine knock sensitivity at knock control circuitry by making the knock circuitry less sensitive and thereby adversely affecting the robustness of such system. The present invention also overcomes the limitations associated with conventional engine systems in which spark advance is calibrated less aggressively, thereby compromising engine fuel economy and engine performance due to smaller spark advance associated with the richer fuel conditions at wide open throttle.

Therefore, the present invention minimizes engine system problems associated with high temperature residual while enabling the engine to exhibit high performance characteristics at higher load conditions and at open throttle conditions. Therefore, the knock sensor peak detection circuitry 58a can be programmed with the lowest possible sensitivity for detecting engine knock, as the circuit does not have to be desensitized due to the burst knock phenomenon.

Referring to FIG. 4, a preferred method of implementing the burst knock control system of the present invention is shown generally at 100. At step 102, the method detects the present condition at the throttle 34. At step 104, the method determines whether the throttle is at a wide open throttle condition. If the throttle is at a wide open throttle condition, the method calculates the total wide open throttle spark advance at 106. If the throttle is not at wide open throttle condition, the method ends. At step 108, the method subsequently determines if total wide open throttle spark advance has been reached. If total wide open throttle spark advance has been reached, the method ends. However, if total wide open throttle spark advance has not been achieved, the method advances to step 110 and determines whether the wide open throttle spark advance is greater than the current spark advance level. If the wide open throttle spark advance is not greater than the current spark advance level, the method advances to step 112 and determines that wide open throttle has already been achieved. However, if the wide open throttle spark advance is greater than the current spark advance, the method advances to step 114 and determines whether the desired number of engine firing events has passed since the spark advance was last incremented. If the answer to this inquiry is no, the method ends. However, if the answer to this inquiry is yes, the method advances to step 116 and increments the current spark advanced by the predetermined, programmed mount. The method subsequently repeats beginning at step 102 for subsequent throttle condition detection.

From the foregoing description, it should be appreciated that the spark advance timing control of the present invention incrementally increases the engine spark advance from a part open throttle condition level to a wide open throttle condition level in response to the throttle sensor sensing a transition in the throttle from a part open throttle condition to a wide open throttle condition. The spark advance timing control of the present invention thereby prevents engine knock by delaying delivery of optimum wide open throttle spark advance until residual gas temperatures have dropped to steady-state wide open throttle levels. The spark advance timing control of the present invention therefore increases engine performance, fuel efficiency and minimizes the wear of associated engine components.

While the above detailed description describes the preferred embodiment of the present invention, the invention is susceptible to modification, variation and alteration without deviating from the scope and fair meaning of the subjoined claims.

What is claimed is:

1. An internal combustion engine system, comprising:

an engine including a plurality of cylinders each having a piston operatively located therein, each said piston having an associated intake stroke, a compression stroke, an expansion stroke, and an exhaust stroke, said engine further including fuel supply means for inputting fuel into said cylinder during said fuel intake stroke, and spark means for igniting said fuel at a predetermined crank angle position of each said piston during said compression stroke;

an engine throttle for controlling fuel input into said cylinder by said fuel supply means;

a throttle sensor for sensing an engine throttle condition; and a controller that receives data from said throttle sensor and outputs an engine control signal for incrementing a spark advance level of said spark means in predetermined increments such that spark advance immediately begins to increase upon said throttle sensor sensing transition of said engine throttle from a transient condition to a wide open condition to thereby minimize engine knock.

2. The system of claim 1, wherein said predetermined increments correspond directly to cylinder firing events.

3. The system of claim 2, wherein said controller increases said spark advance over a plurality of time periods each corresponding to 12 of said cylinder firing events for a six cylinder engine.

4. The system of claim 2, further comprising a Hall-effect sensor for sensing occurrences of said cylinder firing events and for communicating a signal corresponding to said cylinder firing events to said controller for spark advance control purposes.

5. The system of claim 4, further comprising a counter for counting said predetermined number of cylinder firing events detected by said Hall-effect sensor.

6. The system of claim 1, wherein said controller increments said spark advance of said spark means in predetermined increments while residual temperature decrements to steady-state levels.

7. The system of claim 1, further comprising a throttle sensor operatively connected between said engine throttle and said controller for sensing said transition of said engine throttle from said transient condition to said wide open condition and generating a signal indicative of said conditions to said controller.

8. An apparatus for limiting the occurrence of knock conditions in an internal combustion engine, comprising:

a throttle sensor for detecting transition of an engine throttle from a steady state throttle condition to a wide open throttle condition;

spark means for generating a spark for an engine cylinder firing event in response to a current throttle condition, said spark means generating said spark with an associated spark advance; and a controller ,in communication with said throttle sensor, responsive to said wide open throttle condition sensed by said throttle sensor that causes said spark advance to immediately begin to incrementy advance to a maximum level over a predetermined time period.

9. The system of claim 8, wherein said predetermined time period corresponds to a predetermined number of cylinder firing events.

10. The system of claim 9, wherein said predetermined number of cylinder firing events corresponds to 12 cylinder firing events.

11. A method for preventing engine knock in an internal combustion spark ignited engine, comprising the steps of:

monitoring said engine for transition from a steady state condition to a wide open throttle condition;

detecting transition of said engine from said steady state condition to said wide open throttle condition; and increasing a spark advance associated with said engine from a steady state spark advance level to a wide open throttle spark advance level incrementally over a predetermined time period immediately in response to said step of detecting transition of said engine from a steady state condition to a wide open throttle condition to prevent engine knock conditions.

12. The method of claim 11, wherein said step of increasing a spark advance associated with said engine from a steady state spark advance level to a wide open spark advance level incrementally over a predetermined time period comprises increasing said spark advance level over a predetermined number of cylinder firing events.

13. A method for minimizing knock conditions in an internal combustion spark ignited engine, comprising the steps of:

monitoring said engine to detect transition of said engine from a part open throttle condition to a wide open throttle condition;

determining whether said engine is in a wide open throttle condition;

calculating a spark advance value for said engine wide open throttle condition if said engine is placed in a wide open throttle condition;

controlling engine spark advance through use of said calculated spark advance value to minimize engine knock conditions;

determining if said spark advance value for said wide open throttle condition has been achieved;

determining if said spark advance value for said wide open throttle condition is greater than a current spark advance value if said total wide open spark advance value has already been reached;

determining if a predetermined number of engine firing events have passed since said engine spark advance was last incremented if said wide open throttle spark advance value for said wide open throttle condition is greater than said current spark advance value;

incrementing said current spark advance value by a predetermined amount if said desired number of engine firing events have passed since said engine spark advance was last incremented; and indicating that said wide open throttle spark advance value has been achieved if said wide open throttle spark advance is not greater than said current engine spark advance.

* * * * *